United States Patent [19]

Nobori et al.

[11] Patent Number: 5,586,246
[45] Date of Patent: Dec. 17, 1996

[54] IMAGE SYNTHESIS APPARATUS

[75] Inventors: Kunio Nobori; Yoshiyasu Kado, both of Kadoma; Akira Kamogawa, Katano; Masahiro Hamada, Hirakata, all of Japan

[73] Assignee: Matsushita Electric Industrial Co., Ltd., Kadoma, Japan

[21] Appl. No.: 363,711

[22] Filed: Dec. 23, 1994

[30] Foreign Application Priority Data

Dec. 28, 1993 [JP] Japan .................................. 5-337770

[51] Int. Cl.$^6$ ...................................................... G06F 15/16
[52] U.S. Cl. ........................ 395/502; 395/125; 395/127; 395/130; 395/507; 382/285
[58] Field of Search ........................ 395/119, 125, 395/127, 129, 130, 162–166; 382/276, 285, 293, 295, 298, 302, 305

[56] References Cited

U.S. PATENT DOCUMENTS

| 4,737,921 | 4/1988 | Goldwasser et al. | 395/163 |
| 4,967,392 | 10/1990 | Werner et al. | 364/900 |
| 5,255,352 | 10/1993 | Falk | 395/125 |
| 5,408,606 | 4/1995 | Eckart | 395/163 |

FOREIGN PATENT DOCUMENTS 2264370  10/1990  Japan .

*Primary Examiner*—Kee M. Tung
*Attorney, Agent, or Firm*—Renner, Otto, Boisselle, Sklar

[57] ABSTRACT

An image synthesis apparatus for synthesizing an image using model data including information which defines a three-dimensional structure for an object having a plurality of faces, original image data representing values of pixels respectively belonging to the plurality of faces, and rendering data for converting a three-dimensional image synthesized using the model data and the original image data into a two-dimensional image includes memory divided into a plurality of memory blocks each having a prescribed address unit for storing the model data, the original image data, the rendering data, and synthesized image data representing the synthesized two-dimensional image; an arbiter section including an address space, continuous addresses in the address space being allocated to different memory blocks from one another so as to interleave the addresses in the plurality of memory blocks; and a processor section including a plurality of processors each for accessing the memory means through the arbiter section to synthesize an image of one of the faces of the object based on a part of the model data corresponding to the one face, a part of the original image data corresponding to the one face, and a part of the rendering data corresponding to the one face. The original image data and the synthesized image data are each divided into a plurality of rectangular areas on a two-dimensional coordinate plane, and the plurality of rectangular areas are respectively allocated to the plurality of memory blocks.

7 Claims, 8 Drawing Sheets

| Model structure information | Face structure information | Apex structure information |
|---|---|---|
| M0={p0,p1,p2,···} | p0={v0,v1,v2,···}<br>p1={v0,v1,v3,···} | v0={(x0,y0,z0),(u0,v0)}<br>v1={(x1,y1,z1),(u1,v1)} |
| Original image data reference information | ⋮ | ⋮ |

FIG. 6

| Upper address \ Lower address | 00 | 01 | 02 | — | 10 | 11 | 12 | — | 20 | 21 | — |
|---|---|---|---|---|---|---|---|---|---|---|---|
| 00 | 11a 00 | 11a 01 | 11a 02 | — | 11b 00 | 11b 01 | 11b 02 | — | 11c 00 | 11c 01 | — |
| 01 | 11a 10 | 11a 01 | | | 11b 10 | 11b 11 | | | 11c 10 | | |
| 02 | 11a 20 | | 11a | | 11b 20 | | 11b | | | | 11c |
| ⋮ | | | | | | | | | | | |
| 10 | 11a 00 | 11a 01 | | | | | | | | | |
| 11 | 11a 10 | | | | | | | | | | |

| | Lower address | | | | | | | | | | | | | | | | |
|---|---|---|---|---|---|---|---|---|---|---|---|---|---|---|---|---|---|
| | | 00 | 01 | 02 | 03 | 04 | 05 | 06 | 07 | 08 | 09 | 0a | 0b | 0c | 0d | 0e | 0f | 10 |
| Upper address | 00 | 00 | 01 | 02 | 03 | 10 | 11 | 12 | 13 | | | | | | | | | |
| | 01 | 04 | 05 | 06 | 07 | 14 | 15 | 16 | 17 | | Address in the memory block | | | | | | | |
| | 02 | 08 | 09 | 0a | 0b | 18 | 19 | 1a | 1b | | | | | | | | | |
| | 03 | 0c | 0d | 0e | 0f | 1c | 1d | 1e | 1f | | | | | | | | | |
| | 04 | 40 | 41 | 42 | 43 | | | | | | | | | | | | | |
| | 05 | 44 | 45 | 46 | 47 | | | | | | | | | | | | | |
| | 06 | 48 | 49 | 4a | 4b | | | | | Memory block | | | | | | | | |
| | 07 | 4c | 4d | 4e | 4f | | | | | 11a | | | | | | | 11b | |
| | 08 | | | | | | | | | | | | | | | | | |
| | 09 | | : | | | | | | | | | | | | | | | |
| | 0a | | : | | | | | | | | | | | | | | | |
| | 0b | | | | | | | | | | | | | | | | | |
| | 0c | | | | | | | | | | | | | | | | | |
| | 0d | | | | | | | | | | | | | | | | | |
| | 0e | | | | | | | | | | | | | | | | | |
| | 0f | | | | | | | | | | | | | | | | | |
| | 10 | | : | | | | | | | | | | | | | | | |

IMAGE SYNTHESIS APPARATUS

BACKGROUND OF THE INVENTION

1. Field of the Invention

The present invention relates to an image synthesis apparatus for synthesizing images using texture mapping, and in particular to an image synthesis apparatus for realizing high-speed image synthesis with an inexpensive, simple structure having a small memory capacity by way of a memory structure for storing data required for image synthesis.

2. Description of the Related Art

Texture mapping is one of the known methods of so-called three-dimensional computer graphics (CG) for synthesizing a two-dimensional image from a three-dimensional structure of an object using a computer.

By texture mapping, a natural-looking image can be synthesized because pixel values of synthesized image data are obtained based on pixel values of the original image data. However, a large amount of calculation and the large memory access necessary for image synthesis performed by texture mapping often require use of an image synthesis apparatus including a plurality of processors.

Briefly referring to FIG. 10, a conventional image synthesis apparatus including a plurality of processors will be described. FIG. 10 is a block diagram of a conventional image synthesis apparatus.

As is illustrated in FIG. 10, a plurality of processors 100a, 100b, ... (hereinafter, indicated as 100 collectively) are respectively connected to local memories 102a, 102b, ... (hereinafter, indicated as 102 collectively) and also to frame memories 103a, 103b, ... (hereinafter, indicated as 103 collectively) through buses 101a, 101b, ... (hereinafter, indicated as 101 collectively). The frame memories 103 are all connected to an image bus 104.

In the conventional image synthesis apparatus, the total work load is divided into the plurality of processors 100, and each processor synthesizes an image of one of the areas of an object allocated thereto. In detail, each processor 100 stores original image data and image drawing data required for image synthesis to the corresponding local memory 102 and processes such data to generate synthesized image data of the area allocated thereto. The synthesized image data generated by each processor 100 is stored in the corresponding frame memory 103. The frame memory 103 includes a memory such as a VRAM having two ports. Synthesized image data generated by each of the plurality of processors 100 are assembled by the image bus 104 and output.

Generally in such an image synthesis apparatus having a plurality of processors, the level of performance depends on how much the competition among the plurality of processors can be restricted to get the access to data shared by such processors. In the conventional image synthesis apparatus, the original image data and the image drawing data are stored in the local memories 102, and the synthesized image data of each area is stored in the corresponding frame memory 103. In this manner, deterioration in the performance caused by the competition to get the access to the data is avoided, and thus high-speed image synthesis is realized.

In the case when the synthesized image data which has already been generated by the processor 100 or the data which is being processed to generate the synthesized image data is used again as original image data in order to form an image including, for example, a transparent part or a part overlapped on another other part, one of the processors should access the synthesized image data generated by another processor. Since only a limited number of processors can access such data, such image synthesis cannot be performed at a high speed.

Further, in the conventional image synthesis apparatus, the plurality of local memories each need a memory area for the same original image data and the same image drawing data. This requires a large memory capacity and thus raises the cost of producing the apparatus.

SUMMARY OF THE INVENTION

An image synthesis apparatus according to the present invention for synthesizing an image using model data including information which defines a three-dimensional structure of an object having a plurality of faces, original image data representing values of pixels respectively belonging to the plurality of faces, and rendering data for converting a three-dimensional image synthesized using the model data and the original image data into a two-dimensional image includes a memory divided into a plurality of memory blocks each having a prescribed address unit for storing the model data, the original image data, the rendering data, and synthesized image data representing the synthesized two-dimensional image; an arbiter section including an address space, continuous addresses in the address space being allocated to different memory blocks from one another so as to interleave the addresses in the plurality of memory blocks; and a processor section including a plurality of processors each for accessing the memory through the arbiter section to synthesize an image of one of the plurality of faces of the object based on a part of the model data corresponding to the one face, a part of the original image data corresponding to the one face, and a part of the rendering data corresponding to the one face. The original image data and the synthesized image data are each divided into a plurality of rectangular areas on a two-dimensional coordinate plane, and the plurality of rectangular areas are respectively allocated to the plurality of memory blocks.

Thus, the invention described herein makes possible the advantage of providing an inexpensive and high-speed image synthesis apparatus including a memory which can be accessed simultaneously by a plurality of processors.

This and other advantages of the present invention will become apparent to those skilled in the art upon reading and understanding the following detailed description with reference to the accompanying figures.

BRIEF DESCRIPTION OF THE DRAWINGS

FIG. 6 is a view showing an example of the address interleave in a second example according to the present invention;

DESCRIPTION OF THE PREFERRED EMBODIMENTS

Hereinafter, the present invention will be described by way of illustrative examples with reference to the accompanying drawings.

EXAMPLE 1

With reference to FIGS. 1 through 5, an image synthesis apparatus in a first example according to the present invention will be described.

Figure 1:
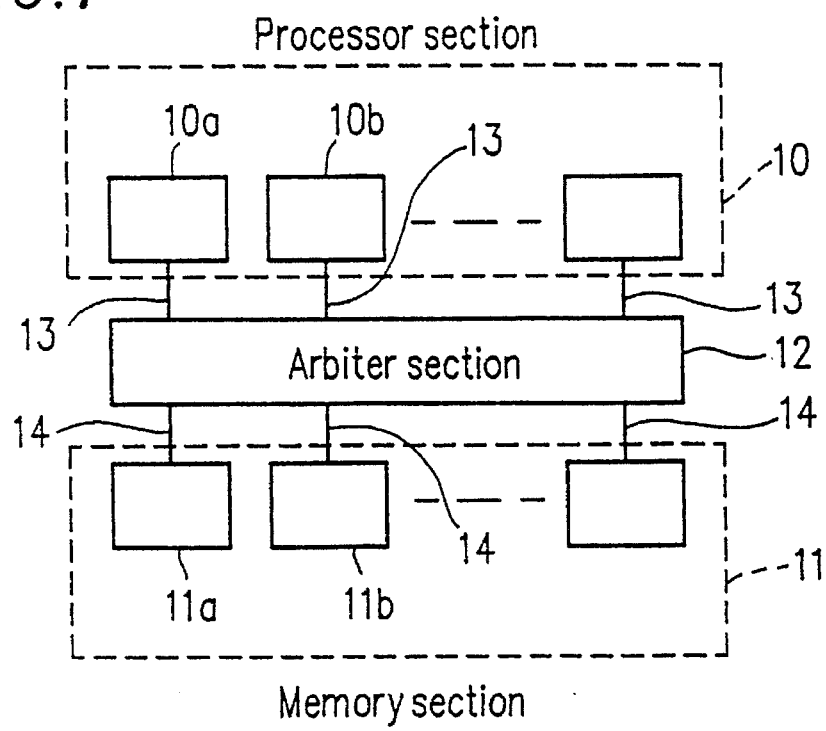
FIG. 1 is a block diagram illustrating the structure of an image synthesis apparatus in a first example according to the present invention.

FIG. 1 is a block diagram schematically illustrating a structure for the image synthesis apparatus in accordance with the first example. As is shown in FIG. 1, the image synthesis apparatus includes a processor section 10. The processor section 10 includes a plurality of processors 10a, 10b, . . . , each of which is connected to an arbiter section 12 through a respective processor bus 13. The image synthesis apparatus further includes a memory section 11, which includes a plurality of memory blocks 11a, 11b, . . . . The plurality of memory blocks 11a, 11b, . . . are each connected to the arbiter section 12 through respective memory buses 14. The plurality of processors 10a, 10b, . . . all have an access to the plurality of memory blocks 11a, 11b, . . . through the arbiter section 12.

Figure 2:
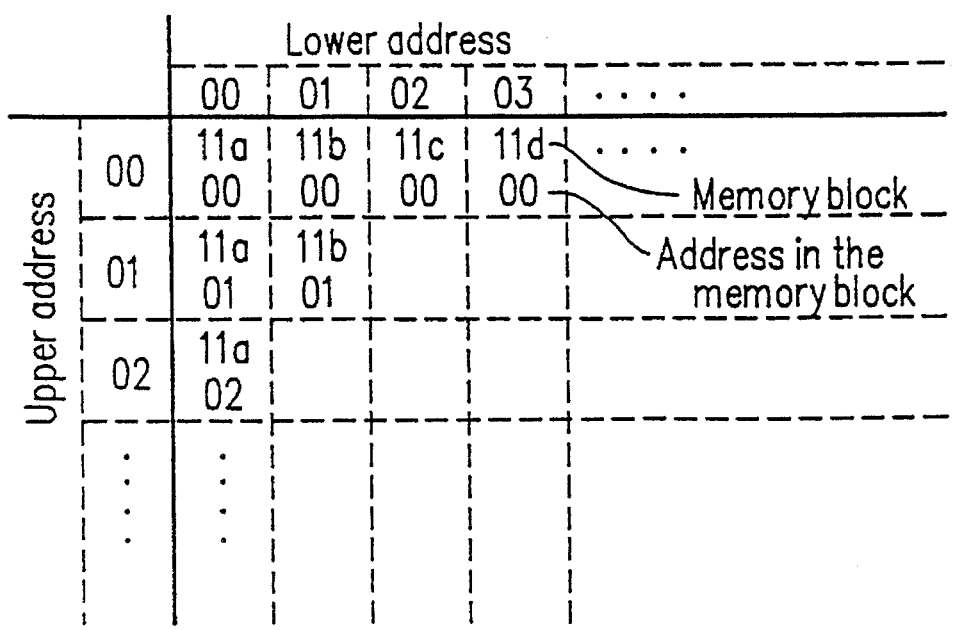
FIG. 2 is a view showing an example of the address interleave in accordance with the first example.

FIG. 2 shows an example of address interleave in the case where the arbiter section 12 has an address space for 16 bits (upper 8 bits+lower 8 bits from the viewpoint of the processor section 10). In other words, FIG. 2 shows the relationship among the addresses in the arbiter section 12, the memory blocks 11a, 11b, . . . and the addresses in each of the memory blocks. In this example of address interleave, continuous addresses in the arbiter section 12 are allocated to different memory blocks 11a, 11b, . . . . For example, address 0×0001 and 0×0002 from the viewpoint of the processor section 10 are respectively allocated to address 0×00 of the memory block 11b and address 0×00 of the memory block 11c. Due to such address interleave, the continuous addresses in the arbiter section 12 can be accessed simultaneously.

If a plurality of addresses allocated to the same memory block are sought by a plurality of processors simultaneously, namely, competition for the memory access is generated, one of the access demands is processed first and the other access demands wait. This deteriorates the performance of the processor section 10 having a plurality of processors. However, the frequency at which such competition is generated can be reduced by allocating a plurality of faces of an object to the memory blocks in a certain manner or by increasing the number of memory blocks with respect to the number of processors which will need to access the same data simultaneously.

Figures 3, 4:
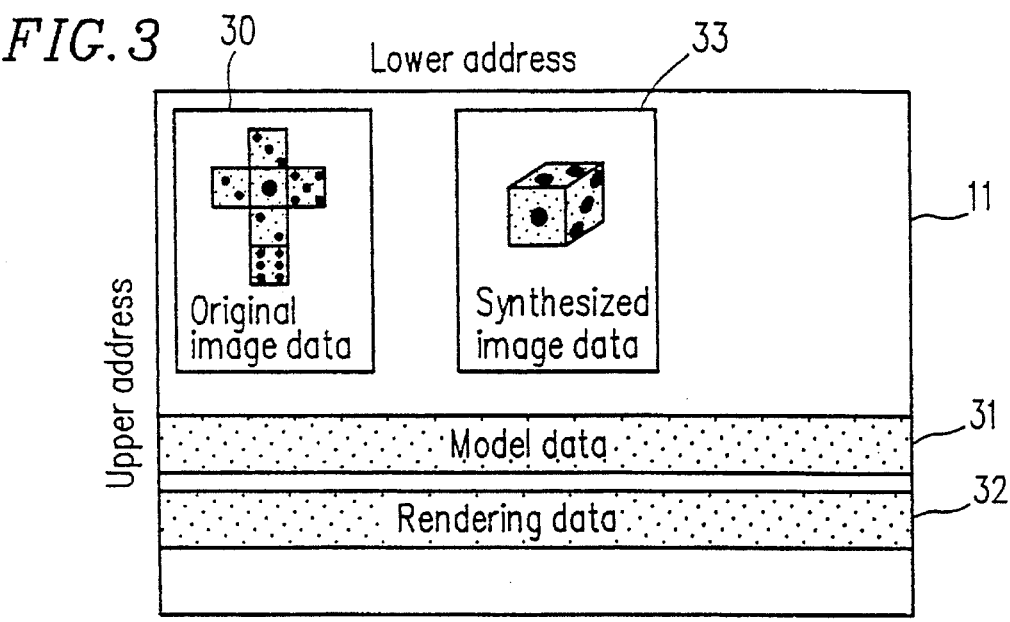
FIG. 3 is a view showing data stored in a memory section in the image synthesis apparatus shown in FIG. 1.
FIG. 4 is a view showing a structure for the model data.

FIG. 3 shows data stored in the memory section 11. As is shown in FIG. 3, the memory section 11 has original image data 30, model data 31, rendering data and synthesized image data 33. The original image data 30 and the synthesized image data 33 each have a two-dimensional arrangement of pixel values respectively belonging to a plurality of faces of an object. The model data 31 includes information defining a three-dimensional structure for the object having the plurality of faces and information on how such information corresponds to the original image data 30. The rendering data 32 includes a viewpoint for synthesis, a face to be projected and other information which are necessary to project a three-dimensional image synthesized using the original image data 30 and the model data 31 on a two-dimensional coordinate plane. The synthesized image data 33 is the data of an image obtained as a result of the synthesis using the original image data 30, the model data 31 and the rendering data 32.

FIG. 4 shows an example of the model data 31 stored in the memory section 11. The model data 31 includes model structure information, face structure information, apex structure information, and original image data reference information. The model structure information shows that the object includes faces p0, p1, . . . .

The face structure information shows the apexes that each face has. The apex structure information shows the two-dimensional coordinate of each apex on the original image data and the corresponding three-dimensional coordinate. The original image data reference information shows how the model structure information, the face structure information, and the apex structure information correspond to the original image data 30. The original image data reference information is referred to sequentially in accordance with the order in which information pieces on the faces are arranged in the model structure information. For example, when an image of a cubic object is synthesized as shown in FIG. 3, the object has six faces, and each face is formed of four apexes. There are eight apexes in all, and each apex exists in correspondence with the original image.

The image synthesis apparatus having the above-described structure operates in the following manner.

Each of the plurality of processors 10a, 10b, . . . synthesizes an image of one of the plurality of the faces p0, p1, . . . in accordance with a given program. The allocation of the faces to the processors is performed by a control section (not shown). The control section may be an arbitrary one of the processors. Each processor accesses the memory section 11 through the arbiter section 12 and reads a part of the model data 31, a part of the original image data 30, and a part of the rendering data 32 which correspond to the face to which the processor is allocated. In the texture mapping, most of the accesses are to the original image data 30 and the synthesized image data 33 (when the synthesized image data 33 is used as original image data as is described in Description of Related Art). After reading the data, each processor generates the synthesized image data 33 and then writes the synthesized image data 33 in the memory section 11. Thus, image synthesis is completed.

The allocation of the faces to the processors is performed in the following manner.

The plurality of processors 10a, 10b, . . . access the memory section 11 An an order prescribed by the control section and refer to the model data 31. Each part of the model data 31 corresponding to each face includes a flag which indicates whether the image synthesis for the corresponding face has already been processed or not, in addition to the information on the faces, apexes and the like. These flags are all set to 0 before the processors start image synthesis. The processors 10a, 10b, . . . each refer to the respective flag in the order in which the information pieces on the faces p0, pl, . . . are arranged in the model structure information, select a face having a flag indicating 0, and set the selected flag to 1 before starting image synthesis. The control section controls the process so that, while one of the processors rewrites the flag 0 to 1, the other processors cannot refer to the model data 31. Accordingly, the processors 10a, 10b, . . . can perform image synthesis for different faces from one another. In this manner, images of a predetermined number of faces on which the information pieces are arranged continuously are synthesized simultaneously among the plurality of faces p0, p1, . . . . The predetermined number of the faces is equal to the number of the processors 10a, 10b.

As has been described, in the image synthesis apparatus in accordance with the first example, the plurality of processors 10a, 10b, . . . synthesize images of different faces of an object. Most of the access demands simultaneously made by the plurality of processors are to parts of the original image data 30 and the synthesized image data 33 stored in different addresses. Therefore, the plurality of processors 10a, 10b, . . . can simultaneously access the plurality of memory blocks 11a, 11b, . . . simultaneously most of the time, which realizes high-speed image synthesis.

Figure 5:
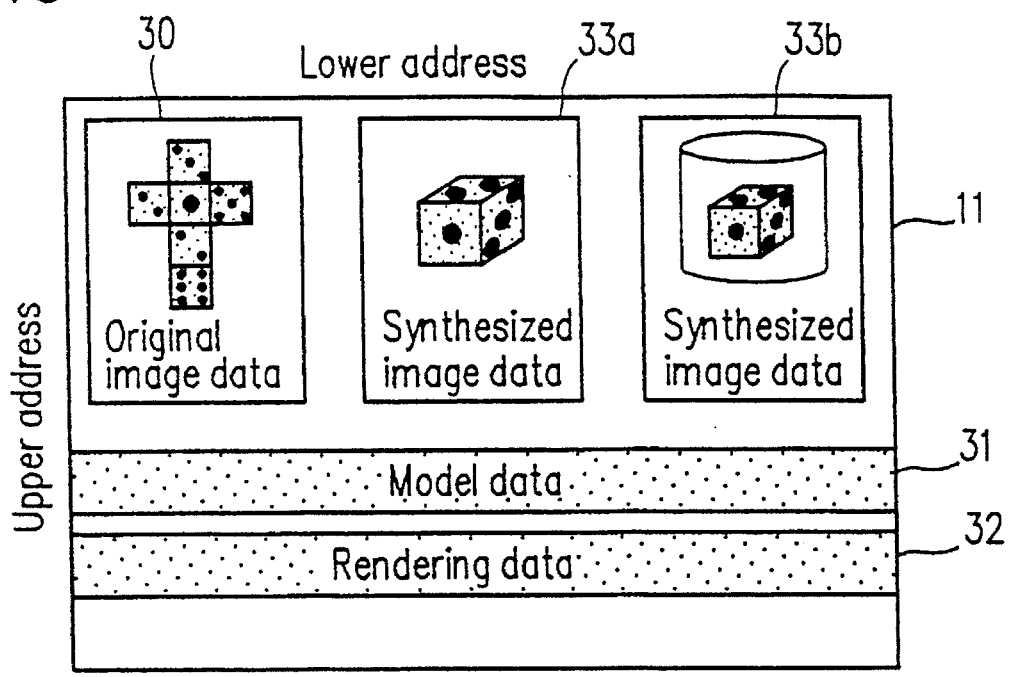
FIG. 5 is a view showing data stored in the memory section in the image synthesis apparatus shown in FIG. 1 in the case where the synthesized image data is used as original image data to generate different synthesized image data.

The synthesized image data 33 generated by the processors is written in a space which is equivalent to the memory space in which the original image data 30 exists from the viewpoint of the processor section 10. Accordingly, even in the case, as is shown in FIG. 5, when the synthesized image data 33a generated by one of the processors needs be used as original image data for generating different synthesized image data 33b the synthesized image data 33a is accessible from any processor. Accordingly, even in such a case, image synthesis can be performed faster than in a conventional image synthesis apparatus. Since there is no need to store a plurality of copies of the original image data 30, the model data 31, the rendering data 32, and the synthesized image data 33a and 33b the capacity of the memory section 11 can be reduced.

EXAMPLE 2

Figure 11:
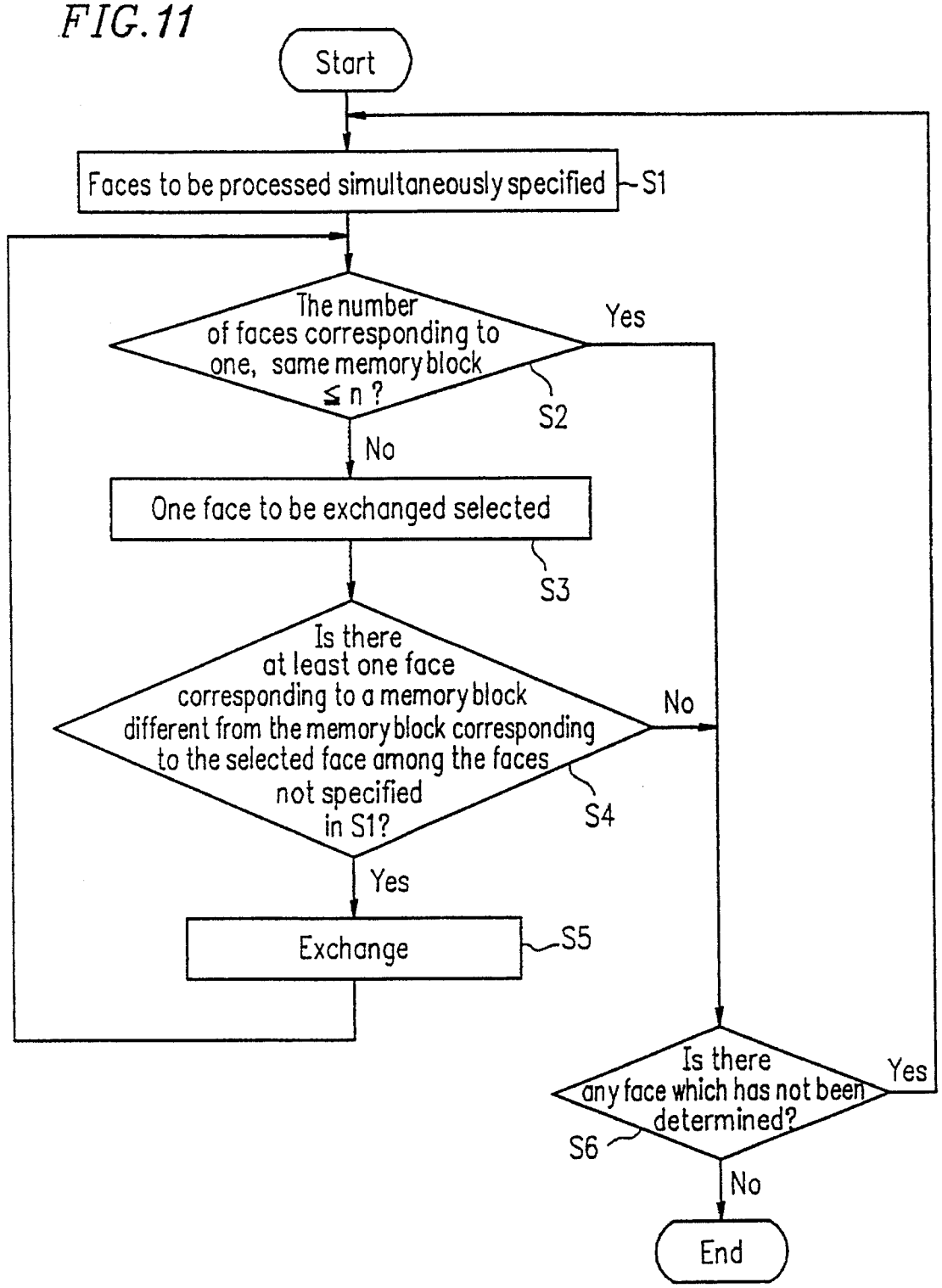
FIG. 11 is a flowchart showing a first method for controlling the order of faces of an object to be processed.
Figure 12:
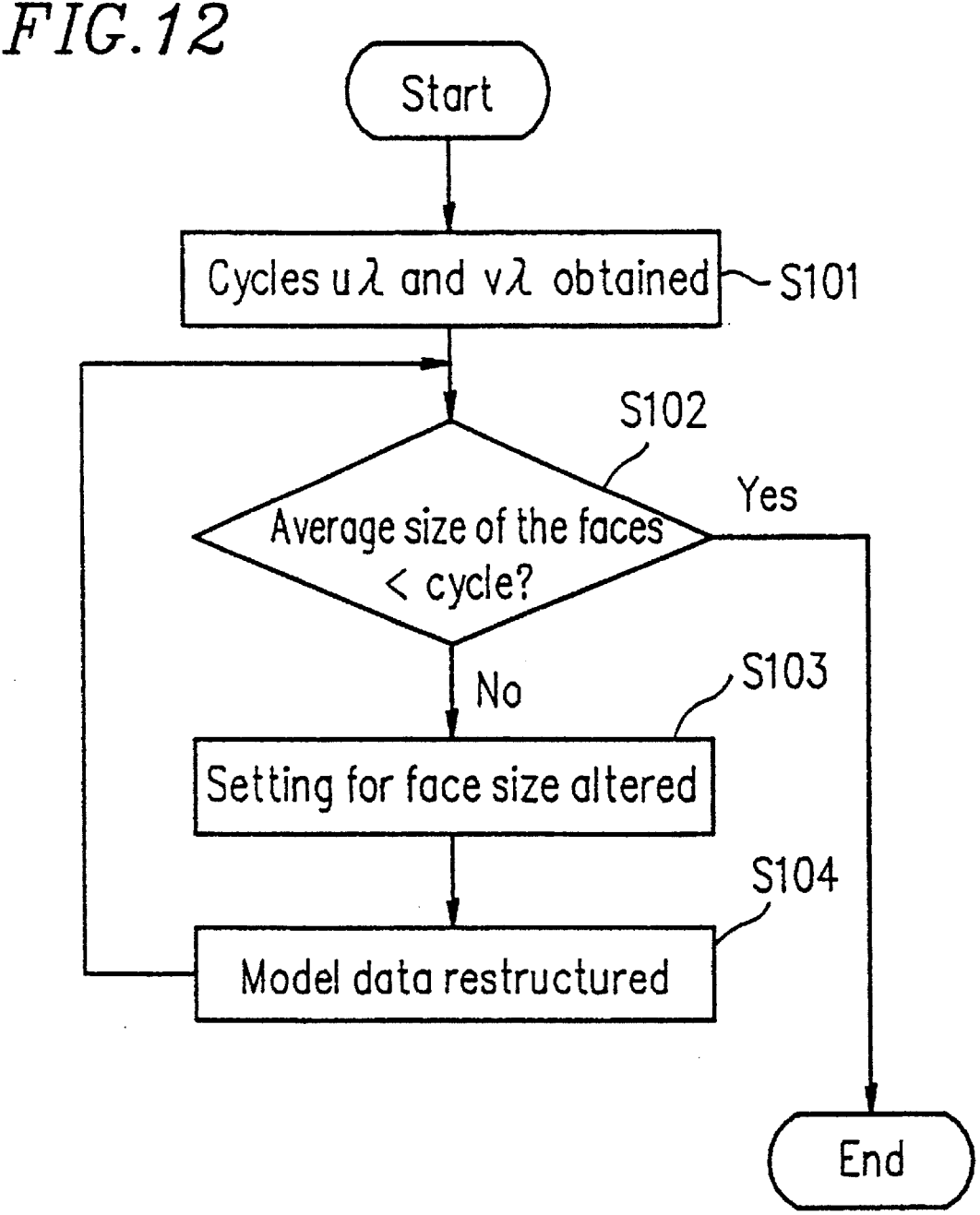
FIG. 12 is a flowchart showing a main part of a second method for controlling the order of faces of an object to be processed.

With reference to FIGS. 6, 11 and 12, an image synthesis apparatus in a second example according to the present invention will be described. The structure and operation of the image synthesis apparatus in accordance with the second example is similar to the apparatus in accordance with the first example except for a method of address interleave performed by the arbiter section 12.

FIG. 6 shows an example of address interleave performed by the arbiter section 12 in accordance with the second example. The address space of the arbiter section 12 is divided into the plurality of memory blocks 11a, 11b, . . . each having a prescribed number of words (in this example, 256 words). A block for interleave allocated to each memory block (a 16×16 block) is allocated to one of rectangular areas obtained by dividing each of the original image data 30 and the synthesized image data 33 into a plurality of rectangular areas on the two-dimensional coordinate plane. By such address interleave, the number of memory blocks which should be accessed by each processor to synthesize an image of the respective face of the object can be reduced compared with in the apparatus in accordance with the first example in most cases.

In addition to the allocation of the faces to the plurality of processors, another type of control is performed so that parts of the original image data 30 and other types of data corresponding to the faces to be processed simultaneously exist in different memory blocks. By such control, the frequency at which competition for access to one (i.e., same memory block) is generated is reduced.

Hereinafter, two methods for such control will be described. Since the access demands to the model data 31 and the rendering data 32 is less than the access demands to the original image data 30 and the synthesized image data 33, control for avoiding competition to get access to the original image data 30 and the synthesized image data 33 will be mainly described.

As is described above, the plurality of processors 10a, 10b, . . . simultaneously synthesize images of an equal number of faces to the number of the processors in accordance with the order set in the model structure information of the model data 31. Therefore, the information pieces on the faces should be arranged in the model structure information so that the original image data 30 and the synthesized image data 33 corresponding to the faces to be processed simultaneously will exist in different memory blocks.

In a first method, the information pieces on the faces are arranged in advance in an arbitrary order in the model structure information of the model data 31. The original image data 30 and model data 31 are read from a secondary memory apparatus or generated by calculation and thus are read into the memory section 11. Then, the memory blocks which respectively include parts of the model data 31 and the original image data 30 corresponding to the faces are fixed. The control section (not shown) determines the memory blocks including the parts of the original image data 30 corresponding to the faces, based on the model structure information. If the parts of the original image data 30 corresponding to the equal number of faces, which are arranged continuously in the model structure information, to the number of the processors, namely, the faces which will be processed simultaneously at a high possibility exist in different memory blocks from one another, no alteration is made. If such parts exist in one, same memory block, the information pieces on the faces are rearranged in the model structure information.

With reference to FIG. 11, the first method will be described in detail. FIG. 11 is a flowchart showing the operation of the control section in the first method. In this example, the image synthesis apparatus including three processors 10a, 10b, and 10c and the memory section 11 having six memory blocks 11a through 11f synthesizes an image of an object having six faces p0 through p5. The parts of the original image data 30 corresponding to the faces p0, p1, p2, p3, p4 and p5 are stored in the memory blocks 11a, 11b, 11a, 11c, 11d, and 11e, respectively.

After the original image data 30 and the model data 31 are read into the memory section 11, the control section performs the control shown in FIG. 11. First, an equal number of faces to the number of the processors are specified as the faces to be processed simultaneously among all the faces in the order in which the information pieces on such faces are arranged in the model structure information (step S1). For example, the three faces p0, p1 and p2 are specified. Next, whether the number of the parts of the original image data 30 corresponding to the above-specified faces which are stored in one, same memory block is at most n or not is determined (step S2). Herein, n is an integer equal to or higher than 0, and is determined in advance with consideration of, for example, the number of processors included in the image synthesis apparatus and the number of the memory blocks. If the number of such parts exceeds n, one of the faces corresponding to such parts is selected as a target of exchange (step S3). For example, the face corresponding to the information piece which is put first in the arrangement is selected. Here, n=0, and the parts of the original image data 30 corresponding to the faces p0 and p2 are stored in the memory block 11a. Accordingly, the face p0 is selected as the target for exchange.

In step S4, whether, among the faces corresponding to the information pieces which are arranged after the above-specified faces, there-is at least one face, the part of the original image data 30 corresponding to which is stored in a memory block different from the memory block which stores the part corresponding to the above-selected face or not is determined. If yes, the face selected in step S3 is exchanged with one of such faces (for example, the face which is put first among such faces) in step S5. Such exchange is repeated until the number of the parts of the original image data 30 which are stored in one, same memory block becomes n or less. If no in step S4, the operation goes to step S6, where whether there is still a face which has not been determined or not is determined. Such operation is repeated until all the faces have been determined. In this manner, the parts of the original image data 30 corresponding to the faces to be processed simultaneously are stored in different memory blocks as much as possible.

In the above-described example, the faces p3 and p0 are exchanged to obtain the order of p3, p1, p2, p0, p4 and p5. Next, the faces p0, p4 and p5 are specified as the faces to be processed simultaneously, and the above-described operation is repeated. The parts of the original image data 30 corresponding to these faces are stored in the memory blocks 11a, 11d, and 11e, respectively. Accordingly, no exchange is necessary.

In this manner, competition among the plurality of processors 10a, 10b, ... to get the access to the original image data 30 is avoided as much as possible when images of the plurality of faces are synthesized simultaneously by such processors. In general, the faces which are not adjacent to one another on the two-dimensional coordinate plane of the original image data 30 are not likely adjacent to one another on a two-dimensional coordinate plane of the synthesized image data 33. The reason will be given below. In order to synthesize high quality images with little area noise, the model data 31 and the original image data 30 are prepared so that the area ratio of the original image data 30 and the synthesized image data 33 is 1:1 in as many faces as possible. Therefore, the relationship among the faces in the original image data 30 and the relationship among the faces in the synthesized image data 33 are close to each other with a high possibility. Accordingly, by avoiding competition among the plurality of processors to get the access to the original image data 30 as much as possible in the above-described manner, the possibility of competition among such processors to get the access to the synthesized image data 33 can also be lowered.

A second method for causing the parts of the original image data 30 corresponding to the faces to be processed simultaneously to exist in different memory blocks will be described, hereinafter.

In the second method, before the original image data 30 and the model data 31 which are generated by calculation are read into the memory section 11, areas of the memory space for storing the original image data 30, the model data 31, the rendering data 32 and the synthesized image data 33 are determined. The parts of the original image data 30 corresponding to the plurality of rectangular areas are allocated to the same memory blocks at a certain cycle. Hereinafter, the cycle in a u direction on a two-dimensional coordinate plane will be referred to as "uλ" and the cycle in a v direction on a two-dimensional coordinate plane will be referred to as "vλ". After the areas for storing the above-mentioned data are determined, the control section refers to the original image data 30 and the model data 31 before read into the memory section 11 and restructures the original image data 30 and the model data 31 so as to fulfil prescribed conditions. The restructuring will be described in detail later. Next, the control section determines a group of faces based on the apex structure information in the model data 31 in the memory section 11 so that the parts of the original image data 30 corresponding to the faces exist in one and the same memory block with low possibility. Based on the result of such determination, the control section determines the order of the faces to be processed by the plurality of processors.

FIG. 12 is a flowchart showing the above-mentioned restructuring performed by the control section. First, the memory blocks to which the rectangular areas of the original image data 30 are allocated are determined, and the cycles uλ and vλ are obtained based on such memory blocks (step S101). Next, the size of each of the parts of the original image data 30 corresponding to the faces on the two-dimensional coordinate plane is obtained, and whether the average size of each of the parts corresponding to the faces in the u direction and such size in the v direction are respectively equal to the uλ and vλ or not is determined (step S102). If such sizes in the u and v directions are respectively larger than the cycles uλ and vλ, setting for the face size for generating the original image data 30 is altered (step S103). In accordance with this alteration, the model data 31 is restructured (step S104).

For example, when the object has the faces p0 through p5, the average size of the parts of the original image data 30 corresponding to these faces in the u direction and such size in the v direction are respectively larger than the cycles uλ and vλ, the control section divides each face. If the object includes 24 faces p0 through p23 by such division, the model structure information of the model data 31 is altered to include information pieces on the faces p0 through p23, and the original image data reference information is altered so that one of the parts of the original image data 30 will be used to synthesize an image of one such face. In accordance, the face structure information and the apex structure information are also altered.

The above-described operation is repeated until the average sizes in the u and v directions become respectively equal to or smaller than the cycles uλ and vλ. The original image data 30 and the model data 31 are thus restructured.

After the restructured original image data 30 and model data 31 are read into the memory section 11, a group of faces, the parts of the original image data 30 corresponding to which exist in one, same memory block at a low possibility is determined. The apex structure information in the model data 31 includes coordinates (ui, vi) in the two-dimensional coordinate plane of the original image data 30 as is illustrated in FIG. 4. Using such coordinates, the control section obtains the coordinate of the center of gravity of each face and the distances between the centers of gravity in the u and v directions. If the distances between the centers of gravity of two faces in the u and v directions are respectively close to natural multiples of the cycles uλ and vλ, there is a high possibility that the parts of the original image data 30 corresponding to these two faces exist in one and the same memory block. If such distances are far from such natural multiples, there is a low possibility that the corresponding parts exist in one and the same memory block. In actuality, the values, which indicate the closeness between the distances between the centers of gravity in the u and v directions and the natural multiples of the cycles uλ and vλ, are obtained for all the pairs of faces as "similarity" by the control section. A group of faces, the parts of the original image data 30 corresponding to which exist in one, same memory block at a low possibility is determined based on the similarity.

Based on the result of such determination, the order of the faces to be processed by the plurality of processors 10a, 10b, . . . is controlled by the control section. In this manner, the possibility of competition among the plurality of processors to get access to one and the same memory block is reduced when images of the plurality of faces are synthesized simultaneously by such processors.

In this example, the original image data 30 and the model data 31, which is structured so that the parts of the original image data 30 corresponding to the faces in the u and v directions have arbitrary sizes, is restructured prior to loading data 30 and 31 into the memory section 11. However, since the above-mentioned cycles uλ and vλ can be known in advance of the generation of the original image data 30 and the model data 31, the original image data 30 and the model data 31 may be structured during calculation so that the average sizes of the parts of the original image data 30 corresponding to the faces in the u and v directions are respectively smaller than the cycles uλ and vλ.

As is described above, in the second example, each of the memory blocks subjected to the address interleave are allocated to one of the rectangular areas obtained by dividing the original image data 30 and the synthesized image data 33 in a lattice on the two-dimensional coordinate plane. By such allocation, the number of memory blocks which should be accessed by each of the plurality of processors to synthesize an image of one face can be reduced. Further in the second example, the order of the faces to be processed is controlled so that the parts of the original image data 30 corresponding to the faces to be processed simultaneously exist in different memory blocks. By such control, the possibility of competition for access can be reduced. As a result, high speed image synthesis is realized.

In the second example, two methods for causing the parts of the original image data 30 and other types of data corresponding to the faces to be processed simultaneously to exist in different memory blocks are described. Other methods may also be used to obtain the same effect. Instead of providing the control section, an arbitrary one of the processors 10a, 10b, . . . may have the function of the control section.

EXAMPLE 3

Figures 7, 8:
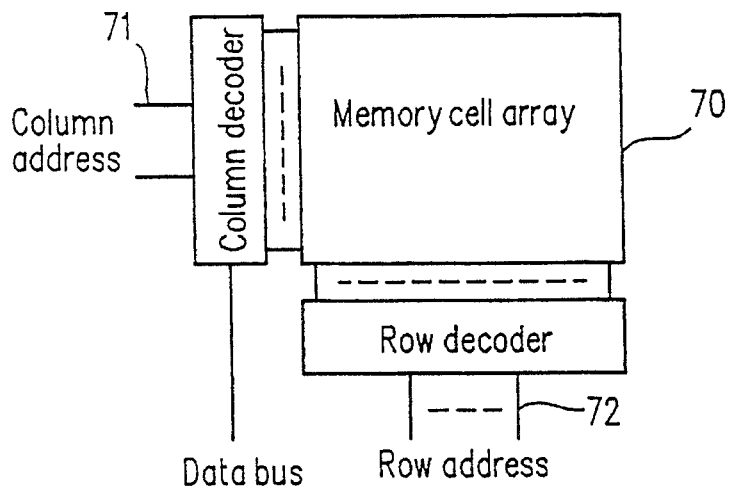
FIG. 7 is a block diagram illustrating a memory cell array in a Dram used in an image synthesis apparatus in accordance with the second example.
FIG. 8 is a view showing an example of the address interleave in a third example according to the present invention.

With reference to FIGS. 7 and 8, an image synthesis apparatus as in a third example according to the present invention will be described.

The structure and operation of the image synthesis apparatus in the third example are similar to those in the second example except for the method of address interleave performed by the arbiter section 12. A memory cell array of a DRAM is used as each of the memory blocks 11a, 11b, . . . .

FIG. 7 shows a general structure for a memory cell array 70 of a DRAM. Data stored in the memory cell array 70 is specified by a combination address of a column address 71 and a row address 72. Data in a certain combination address is read in the following manner. First, the row address in the certain combination address is specified to read all the data of the specified row. Then, the column address is specified to access the certain combination address. Due to such a manner, continuous access to the data stored in the same row address is performed at a higher speed than continuous access to the data stored in different row addresses.

In order to utilize the above-described advantage of the memory cell of a DRAM, rectangular areas of the original image data 30 and the synthesized image data 33 are each allocated to one memory block, namely, one memory cell array; and sub rectangular areas which are obtained by further dividing each rectangular area are each allocated to one row of one memory cell array. FIG. 8 shows an example of address interleave in accordance with the third example. In this example of address interleave, a memory cell array having 256 words (4 bits for a column address +4 bits for a row address =8 bits) is used as one memory block. In each memory block, the lower 4 bits represent the column address and the upper 4 bits represent the row address.

As is described in the first and the second examples, when images with a plurality of faces are synthesized simultaneously by a plurality of processors respectively allocated thereto, the parts of the original image data 30 and the synthesized image data 33 corresponding to the areas adjacent to one another on the two-dimensional coordinate planes of the original image data 30 and the synthesized image data 33 are accessed sequentially at a high frequency. By allocating each sub rectangular area for one row as in this example, the parts of the original image data 30 and the synthesized image data 33 corresponding to the areas adjacent to one another are stored in one and the same row address of the memory cell. Accordingly, the reduction in the speed of access to the memory cell array caused by changing row addresses is avoided.

By controlling the order of the faces which are processed simultaneously as in the second example, the possibility of competition for access to one and the same memory cell array is reduced in the image synthesis apparatus in accordance with the third example using the DRAM. In this manner, high speed image synthesis using a DRAM can be realized.

EXAMPLE 4

Figure 9:
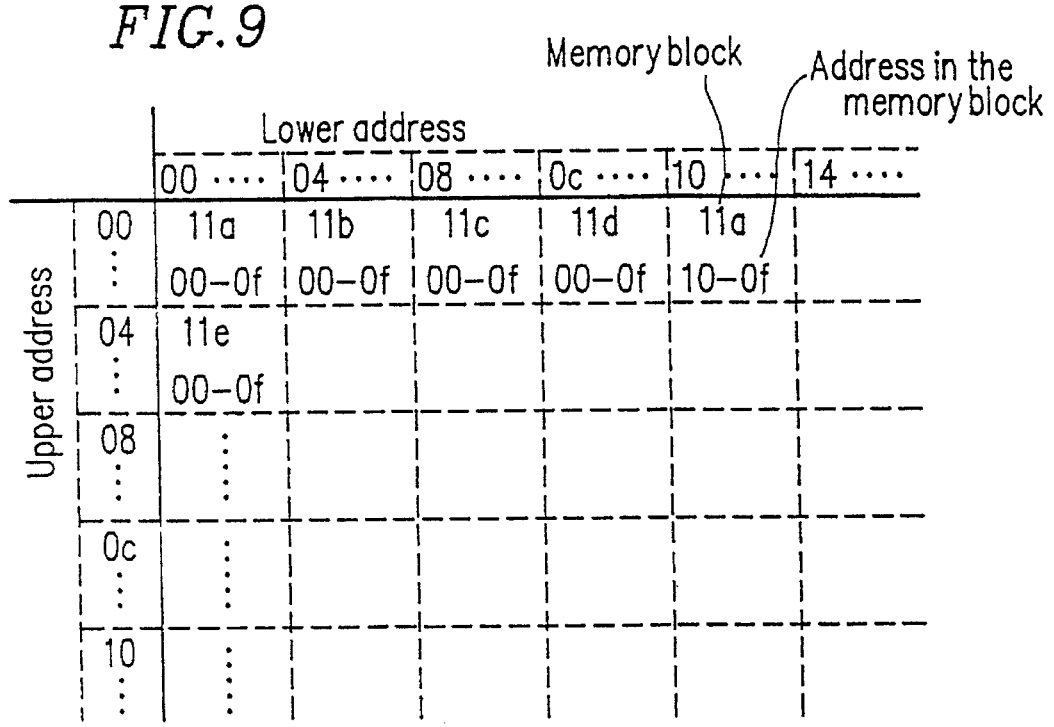
FIG. 9 is a view showing an example of address interleave in a fourth example according to the present invention.
Figure 10:
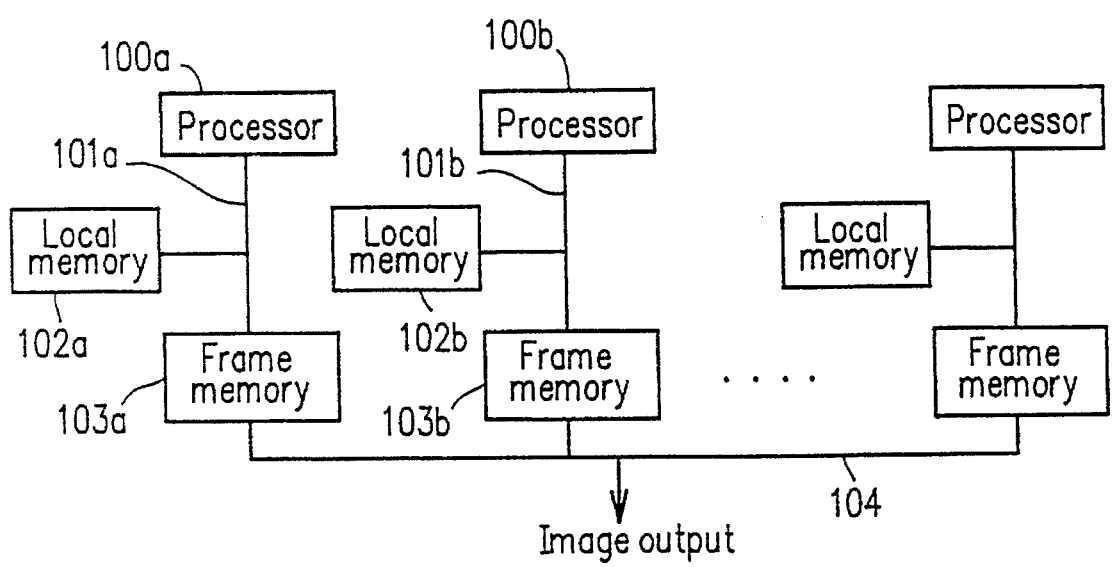
FIG. 10 is a block diagram illustrating the structure of a conventional image synthesis apparatus.

With reference to FIG. 9, an image synthesis apparatus of a fourth example according to the present invention will be described. The structure and operation of the image synthesis apparatus in the fourth example are similar to those in the third example except for the method of address interleave performed by the arbiter section 12.

FIG. 9 shows an example of address interleave in accordance with the fourth example. As in the third example, a memory cell array of a DRAM is used as each memory block, and the parts of the original image data 30 and the synthesized image data 33 corresponding to each sub rectangular area are allocated to one row of one memory cell array. The parts of the original image data 30 and the synthesized image data 33 corresponding to sub rectangular areas adjacent to one another on the two-dimensional coordinate plane are allocated to different memory blocks.

In the third example, it is described that the possibility of competition for the access to one and the same memory block is reduced by controlling the order of the faces so that the faces far from one another on the two-dimensional coordinate plane will be processed simultaneously. By contrast, it is also possible to process simultaneously the faces proximate to one another on the two-dimensional coordinate, for example, by performing the control for selecting the faces to be processed simultaneously so that the parts of the original image data 30 corresponding to these faces exist within a region having a size of $u\lambda \times v\lambda$. The method of address interleave in accordance with the fourth example is effective in reducing the frequency of competition for the access in such a case.

Regarding the arrangement of the model data 31, the part of the face structure information including the arrangement of apexes defining a certain face may be stored in the memory block which also stores the part of the original image data 30 corresponding to the above-mentioned certain face. In this manner, the frequency of competition for access can be thus reduced. Such frequency can also be reduced by storing the part of the apex structure information corresponding to a certain face in the memory block which also stores the part the original image data 30 corresponding to the certain face. By these methods, higher speed image synthesis can be realized.

In the first example, the address space of the arbiter section 12 from the viewpoint of the processor section 10 has 16 bits. The same effects are obtained even if the address space has a different number of bits. The effects in the second example are achieved even if each memory block has an address space having different number of words instead of 256 words.

In the first through fourth examples, the object is formed of polygonal faces. It is not necessary that all the faces of the object should be polygonal. The same effects are obtained as long as images of a plurality of faces are synthesized by a plurality of processors.

In the above-described examples, the memory section 11 and the arbiter section 12 may be included in a single LSI. This allows the size of the image synthesis apparatus to be smaller, resulting in reducing the cost for manufacturing such an apparatus.

As has been described so far, according to the present invention, images of a plurality of faces can be synthesized by a plurality of processors at a high speed without copying the same data such as original image data in the memory corresponding to all the processors, even in the case where synthesized image data generated by one of the processors is used as original image data to synthesize different synthesized image data. Accordingly, an inexpensive, high-speed image synthesis apparatus with a small memory capacity can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image synthesis apparatus for synthesizing an image using model data including information which defines a three-dimensional structure for an object having a plurality of faces, original image data representing values of pixels respectively belonging to the plurality of faces, and rendering data for converting a three-dimensional image synthesized using the model data and the original image data into a two-dimensional image, the image synthesis apparatus comprising:

memory means divided into a plurality of memory blocks each having a prescribed address unit for storing the model data, the original image data, the rendering data, and synthesized image data representing the synthesized two-dimensional image;

an arbiter section including an address space, continuous addresses in the address space being allocated to different memory blocks from one another so as to interleave the addresses in the plurality of memory blocks; and processor means including a plurality of processors each for accessing the memory means through the arbiter section to synthesize an image of one of the plurality of faces of the object based on a part of the model data corresponding to the one face, a part of the original image data corresponding to the one face, and a part of the rendering data corresponding to the one face, wherein the original image data and the synthesized image data are each divided into a plurality of rectangular areas on a two-dimensional coordinate plane, and the plurality of rectangular areas are respectively allocated to the plurality of memory blocks.

2. An image synthesis apparatus according to claim 1, wherein the information defining the three-dimensional structure includes a one-dimensional arrangement of information pieces respectively defining the plurality of faces, and the plurality of processors respectively synthesize images of the plurality of faces in the order in which the information pieces are arranged thus to simultaneously synthesize the images of an equal number of faces to the number of the plurality of processors; the image synthesis apparatus further comprising means for altering the arrangement of the information pieces in the case that parts of the original image data corresponding to the faces to be processed simultaneously are determined to be stored in one, same memory block.

3. An image synthesis apparatus according to claim 1, wherein the plurality of processors simultaneously synthesize the images of an equal number of faces to the number thereof, and the plurality of rectangular areas are allocated to one, same memory block every first distance in a first direction and every second distance in a second direction, the image synthesis apparatus further comprising:

altering means for, before the original image data is stored in the memory means, altering a structure of the original image data so as to reduce the size of a part of the original image data corresponding to one arbitrary face of the object in the first direction to a size smaller than the first distance and so as to reduce the size of such a part in the second direction to a size sufficiently smaller than the second distance; and selection means for selecting the faces to be processed simultaneously so that parts of the original image data corresponding to the faces to be processed simultaneously will be stored in different memory blocks.

4. An image synthesis apparatus according to claim 1, wherein the memory means includes a DRAM, the plurality of the memory blocks are each a memory cell array of the DRAM, the plurality of rectangular areas are each further divided into a plurality of sub rectangular areas, and the plurality of sub rectangular areas are respectively allocated to a plurality of row addresses in the memory cell array.

5. An image synthesis apparatus according to claim 1, wherein the memory means includes a DRAM, the plurality of the memory blocks are each a memory cell array of the DRAM, the plurality of rectangular areas are each further divided into a plurality of sub rectangular areas, and the plurality of sub rectangular areas are respectively allocated to a plurality of row addresses in the memory cell array so that the sub rectangular areas adjacent to one another correspond to different memory cell arrays.

6. An image synthesis apparatus according to claim 1, wherein a part of the model data corresponding to one of the faces of the object is stored in the memory block which also stores a part of the original image data corresponding to the one face.

7. An image synthesis apparatus according to claim 1, wherein the memory means and the arbiter section are included in a single LSI.

\* \* \* \* \*